Dec. 11, 1951     W. A. PLICE     2,577,806

NETWORK FOR INTERCOMMUNICATION SYSTEM

Filed July 21, 1949

INVENTOR
William A. Plice
BY
Richard C. Lindberg
ATTORNEY

Patented Dec. 11, 1951

2,577,806

UNITED STATES PATENT OFFICE 2,577,806

NETWORK FOR INTERCOMMUNICATION SYSTEM

William A. Plice, Oak Park, Ill., assignor to Richard C. Lindberg and Philip A. Klapman, both of Chicago, Ill., as trustees Application July 21, 1949, Serial No. 105,958

14 Claims. (Cl. 179—1)

The present invention relates to inter-communicating systems, and more particularly to a network of the discriminator type suitable for inter-communication systems utilizing a single transducer as receiver and transmitter.

In inter-communication networks and systems such as commonly employed in offices and factories, it has been customary to use a single transducer at each station for performing the functions of transmitter and receiver, or microphone and loud speaker. Customarily, switching means are provided whereby the transducer is alternately used for talking and listening. The use of such switches necessarily limits the flexibility of the system and, of course, it would be highly desirable to provide an arrangement whereby simultaneous transmission and reception could be obtained without the necessity of switches.

Amplifiers suitable for two-way communication provided with echo suppressors have been commonly employed by the telephone companies. Such amplifiers, however, are relatively expensive and, hence, cannot be employed in inter-communicating systems of the type used in industrial installations. It has been suggested that circuit means might be provided which are of the bridge network type whereby a single transducer would serve as a transmitter and receiver. One of the difficulties encountered in such networks or bridge circuit, however, is that of obtaining stable operations throughout the range of the speech frequencies. Another difficulty which has been encountered by many such suggested solutions is the wide variations occurring in transducers of the type commonly employed in inter-communicating systems. The impedance characteristics vary so much that it is substantially impossible to use balancing networks without individual adjustment of each network. Obviously, where a large number of communication stations are employed, this is not economically feasible.

Furthermore, it has been suggested that a system might be used employing balanced transformers similar to hybrid coils common in telephone communication circuits. It has ben found that such balanced transformers are not readily manufactured in quantities within the tolerances required for a reasonable balance. It also has been discovered that many such balanced transformer constructions are balanced at only a relatively narrow frequency range and that for a range covering the usual speech frequencies, the circuit no longer is balanced.

In accordance with the present invention the difficulties encountered in suggested solutions either from technical requirements or economical manufacture are obviated by the use of a simple, economical discriminator network which permits a single transducer to be used as a receiver and transmitter.

It is, therefore, an object of the present invention to provide a simple, economical discriminator network for inter-communication systems utilizing a single transducer as a receiver and transmitter.

A further object of the present invention is to provide an improved economical discriminator network for inter-communication systems using a single transducer as receiver and transmitter whereby all switching is eliminated, and no special components are employed.

A still further object of the present invention is to provide an improved network for reducing gain of speech feed-back loops to less than unity while transmitting speech with a gain of unity or greater.

Another object of the present invention is to provide a discriminating network for inter-communication systems which will enable a multiple station to inter-communicate with a single transducer at each station simultaneously.

A still further object of the present invention is to provide a novel network which will discriminate as to whether a signal is from a transducer of an adjacent station or from a transducer of a remote station.

A still further object of the present invention is to provide a discriminating network for inter-communication systems suitable for use in a multiple station system which will provide stable operations throughout a range of speech frequencies, and which will permit a single transducer to serve as a transmitter and receiver without any manual control thereof.

Other and further objects of the invention will become apparent from a study of the description hereinafter taken together with the drawing which illustrates a preferred embodiment of the invention. While the invention is described in terms of a preferred embodiment, the scope of the invention is not intended to be limited in terms of the embodiment shown nor otherwise than by the terms of the appended claims.

Figure 1:
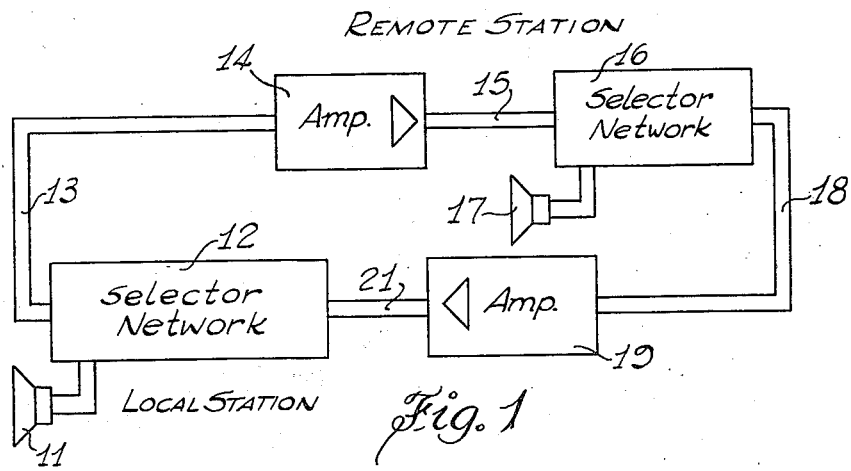
Figure 1 is a block diagram of a two-station inter-communication system incorporating the selector network of the present invention.

Referring to the block diagram of Figure 1 there is shown a transducer 11 at a local station which is connected to a selector network 12 also located at that station. The selector network 12 is connected through a pair of conductors 13 to an amplifier 14 which in turn is connected through conductors 15 to a selector network 16. The selector network 16 is located at a remote station and is provided with a transducer 17. The selector network at the remote station is connected through a pair of conductors 18 to an amplifier 19 which, in turn, is connected through a pair of conductors 21 to the selector network 12 at the local station.

The problem to be solved by the use of the present invention is readily appreciated by a study of Figure 1. The problem essentially is to reduce the gain of any feed back loops to less than unity while transmitting speech with a gain of unity or greater from person to person or station to station. To make the operation of the system independent of its surroundings, the feed back loop is limited to the electrical circuit wherein one element may coincidentally perform the functions of a transmitting and receiving transducer.

Figure 2:
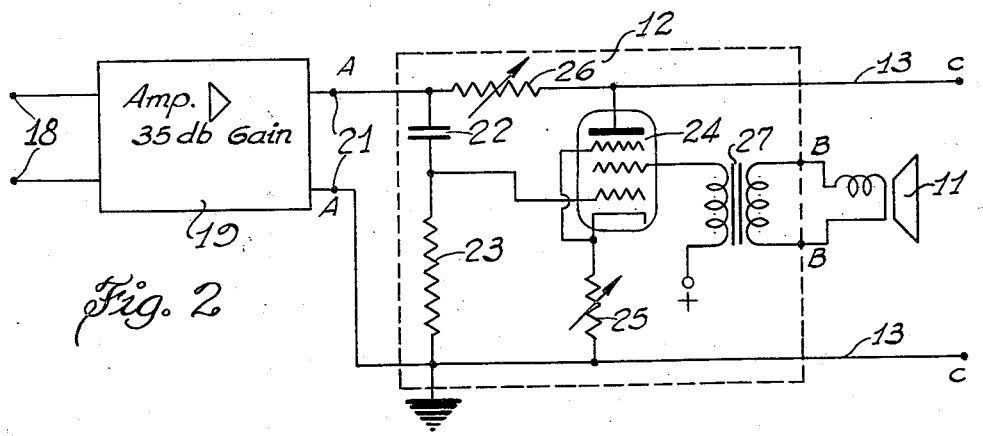
Figure 2 is an electrical circuit diagram illustrating one embodiment of the selector network of the present invention.

On reference to Figure 2 it will be noted that a portion of the block diagram of Figure 1 has been illustrated which includes the amplifier 19 and the selector network 12. Since most intercommunicating networks of this type provide an amplifier gain having a range of 35 db. gain to 50 db. gain, this lower value has been indicated in the rectangle 19. For the sake of subsequent explanation and analysis of details of the circuit within the dotted rectangle 12 which comprises the selector network, it will be seen that this network is provided with three sets of terminals A—A; B—B; and C—C. The attenuation which occurs between terminals A—A and terminals C—C is of the order of the gain provided by the amplifier 19. The terminals A—A which are connected to the conductors 21 are connected to an impedance circuit comprising a series connected capacitor 22 and a resistor 23. The juncture between the resistor 23 and the capacitor 22 is connected to the grid of a multi-element tube 24 which preferably is of a type having a control grid and a screen grid. The cathode of the vacuum tube 24 is connected through a self-biasing resistor 25 to the common ground conductor which is connected to one terminal of resistor 23. The anode of tube 24 is supplied from a suitable source of potential which may be obtained from the source which supplies potential to the amplifier 19. Thus an adjustable resistor 26 is connected between the anode of the vacuum tube 24 and one terminal of the capacitor 22. This resistor 26 is adjusted for the best balance or operating condition.

The vacuum tube 24 may be of any suitable type such as a 6F6, which has a suppressor grid connected to the cathode. The screen grid of the vacuum tube 24 is connected through the primary winding of a transformer 27 to a suitable source of screen grid potential. The secondary winding of the transformer 27 is connected to the terminals B—B which are connected to the voice coil of the transducer or loud speaker 11.

The grid which is normally termed a screen grid in the vacuum tube 24 operates both as an anode and a grid. The screen grid serves as an anode with respect to the control grid of the vacuum tube 24. The screen grid serves as a control grid whenever the transducer 11 is operating as a transmitter. It should be remembered that the screen grid is placed geometrically farther away from the cathode than the control grid and surrounds the control grid so that it serves or acts as a plate with respect to the control grid under certain operating conditions. Any signal placed upon the screen grid, however, when the transducer 11 is serving as a transmitter will not appear or be reflected in the grid to cathode circuit of the vacuum tube 24. Bearing this relationship in mind it has been found possible to assume an expression for the mutual coupling impedance between the anode and screen grid currents and also for the dynamic screen grid resistance.

Figure 3:
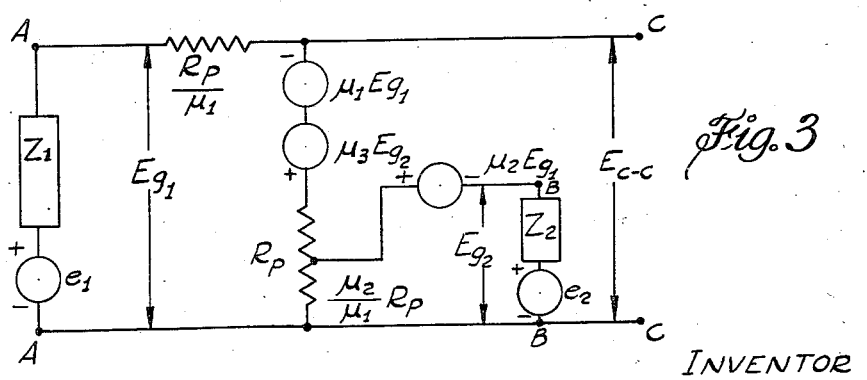
Figure 3 is an equivalent network diagram of the electrical circuit shown in Figure 2.

With this assumption reference may be made to Figure 3, which is the equivalent impedance circuit of the electrical circuit shown in Figure 2. It will be noted that the terminals A—A have connected there across an impedance and a source of alternating current voltage. This alternating current voltage is assumed to be a complex voltage made up of the necessary speech frequency components. The voltage source $e_1$, therefore, impresses a potential $E_{g1}$ across the conductors connected to the terminals A—A.

The transducer which is connected across the terminals B—B is represented by another impedance and a voltage source which is indicated as $e_2$. This produces between the terminals B—B the voltage $E_{g2}$.

The voltage appearing across the terminals A—A is represented by the equation:

$$E_{g1} = e_1 - i_p Z_1$$

A similar equation may be set up for the voltage appearing across the terminals B—B:

$$E_{g2} = e_2 - i_s Z_2$$

in accordance with Kirchhoff's law around the circuit, an equation may be set up for the anode current which is $i_p$. Generally, another equation employing Kirchhoff's law may be set up for the current $i_s$ which is the screen grid current or the plate current when the transducer is employed as a receiver. By suitable mathematical computation from these equations it is possible to obtain an equation showing the potential which appears across the terminals C—C.

As a result of this mathematical computation, the following equation is obtained:

$$e_{cc} = e_1 - i_p\left(Z_1 + \frac{R_p}{u_1}\right) = e_1 - \left(Z_1 + \frac{R_p}{u_1}\right)\left(\frac{e_1}{\frac{R_p}{u_1} + Z_1}\right) +$$

$$\frac{e_2 \frac{u_2}{u_1} \cdot R_p(u_3 - 1)}{\left(\frac{R_p}{u_1} + Z_1\right)\left(Z_2 + \frac{u_2}{u_1} R_p\right)\left[(1+u_1) - \frac{u_2\left(u_3 Z_2 + \frac{u_2}{u_1}\right)R_p}{Z_2 + \frac{u_2}{u_1} \cdot R_p}\right]}$$

$$e_{cc} = e_1 - i_p\left(Z_1 + \frac{R_p}{U_1}\right) =$$

$$\frac{e_2 \frac{u_2}{u_1} \cdot R_p(u_3 - 1)}{\left(Z_2 + \frac{u_2}{u_1} \cdot R_p\right)\left[(1+u_1) - \frac{u_2\left(u_3 Z_2 + \frac{u_2 R_p}{u_1}\right)}{Z_2 + \frac{u_2}{u_1} \cdot R_p}\right]}$$

An analysis of this mathematical relation shows that the voltage appearing across the terminal C—C is independent of the voltage $e_1$, so that no voltage due to $e_1$ appears at the terminal C—C, but a voltage due to $E_2$ does appear across the terminal C—C.

The assumption made at the beginning of the mathematical analysis has been verified experimentally. A demonstration of a circuit corresponding to that shown in Figure 1 shows that in addition to conventional amplifiers commonly provided for inter-communication circuits it is only necessary to use a single tube with each transducer. Hence a commercially available tube and inexpensive components for the remainder of the circuit are employed, the advantages of the present invention are readily appreciated. The circuit therefore provides an automatically operating system requiring no manual manipulation or control to provide two-way communication with a single transducer at each station.

What I desire to protect by United States Letters Patent is claimed as follows:

1. In an intercommunication system, a discriminator network comprising a transmitting output circuit, a receiving input circuit, means for interconnecting said circuit including a conductive impedance device having a cathode, a plurality of grids and an anode, means connecting one of said grids to said receiving input circuit, means connecting the other of said grids in both of said circuits, and means connecting said anode in said transmitting circuit.

2. In an intercommunication system, a discriminator network comprising a transmitting output circuit, a receiving input circuit, a transducer, and means for interconnecting said circuits including a multi-eletrode vacuum tube having a cathode, a plurality of grids and an anode, means connecting one of said grids to said receiving input circuit, means for connecting the other of said grids to said transducer, and means connecting the anode in said transmitting circuit.

3. In an intercommunication system, a discriminator network comprising a transmitting output circuit, a receiving input circuit, a transducer, a source of potential, and means for interconnecting said circuits including a multi-electrode vacuum tube, means for connecting a grid of said vacuum tube to said receiving input circuit, means for connecting a second grid of said vacuum tube to said transducer and said source of potential, and means for connecting an anode of said vacuum tube to said transmitting output circuit.

4. In a network for discriminating as to the signals emanating from a remote station and from a local station, a transmitting output circuit for the signal from said local station, a receiving input circuit for the signal from said remote station, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to respond to the signal from said local station, the first of said grids acting as a control grid for the second of said grids when said second grid is acting as an anode for said receiving input circuit.

5. In a network for discriminating as to the signals emanating from a remote station and from a local station, a transmitting output circuit for the signal from said local station, a receiving input circuit for the signal from said remote station, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to respond to the signal from said local station, the first of said grids acting as a control grid for the second of said grids when said second grid is acting as an anode for said receiving input circuit, and means for connecting said first named anode in said transmitting output circuit to said remote station, and said second grid acting coincidentally as a control grid for the transmitting output circuit.

6. In a network for discriminating as to the signals emanating from a remote station and from a local station, a transmitting output circuit for the signal from said local station, a receiving input circuit for the signal from said remote station, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to respond to the signal from said local station, the first of said grids acting as a control grid for the second of said grids when said second grid is acting as an anode for said receiving input circuit, means for connecting said first named grid and said first named anode in a grid to anode circuit of said receiving input circuit, and an impedance in said grid to anode circuit of said receiving input circuit for reducing the gain from said receiving input circuit to said transmitting output circuit to a desired level.

7. In a network for discriminating as to the signals emanating from a remote station and from a local station, a transmitting output circuit for the signal from said local station, a receiving input circuit for the signal from said remote station, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to respond to the signal from said local station, the first of said grids acting as a control grid for the second of said grids when said second grid is acting as an anode for said receiving input circuit, means for connecting said first named anode in said transmitting output circuit to said remote station, and said second grid acting coincidentally as a control grid for said transmitting output circuit, means for connecting said first named grid and said first named anode in a grid to anode circuit of said receiving input circuit, and an impedance in said grid to anode circuit of said receiving input circuit for reducing the gain from said receiving input circuit to said transmitting output circuit to a desired level.

8. In a network for discriminating as to the source of signals emanating from a remote station and from a local station, a transmitting output circuit for the signal from said local station, a receiving input circuit for the signal from said remote station, a transducer adapted coincidentally to transmit signal energy controlled by said receiving input circuit and to receive signal energy for the control of said transmitting output circuit, a source of potential, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to said transducer and said source of potential, means for connecting said anode in said transmitting output circuit, said first named grid acting as a control grid for said second grid when said second grid is acting as an anode in circuit with said transducer to receive signal energy controlled by said receiving input circuit.

9. In a network for discriminating as to the source of signals emanating from a remote station and from a local station, a transmitting output circuit for the signal from said local station, a receiving input circuit for the signal from said remote station, a transducer adapted coincidentally to transmit signal energy controlled by said receiving input circuit and to receive signal energy for the control of said transmitting output circuit, a source of potential, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means for connecting the second of said grids to said transducer and said source of potential, means for connecting said anode in said transmitting output circuit, said first named grid acting as a control grid for said second grid when said second grid is acting as an anode in circuit with said transducer to receive signal energy controlled by said receiving input circuit, and said second grid acting coincidentally as a control grid for said anode connected in said transmitting output circuit.

10. In a network for discriminating as to the source of signals emanating from a remote station and from a local station, a transmitting output circuit for the signal from said local station, a receiving input circuit for the signal from said remote station, a transducer adapted coincidentally to transmit signal energy controlled by said receiving input circuit and to receive signal energy for the control of said transmitting output circuit, a source of potential, means for interconnecting said circuits comprising a conductive impedance device responsive to the signal from said remote station and responsive to the signal from said local station, said conductive impedance device having a cathode, a plurality of grids and an anode, means connecting one of said grids to respond to the signal from said remote station, means connecting the second of said grids to said transducer and said source of potential, means for connecting said anode in said transmitting output circuit, said first named grid acting as a control grid for said second grid when said second grid is acting as an anode in circuit with said transducer to receive signal energy controlled by said receiving input circuit, means connecting said first named grid and said first named anode in a grid to anode circuit of said receiving input circuit, and an impedance in said grid to anode circuit of said receiving input circuit for reducing the gain from said receiving input circuit to said transmitting output circuit to a desired minimum.

11. In a network for discriminating as to the source of signals emanating from a remote station and from a local station, a transmitting output circuit for the signal from said local station, a receiving input circuit for the signal from said remote station, a transducer adapted coincidentally to transmit signal energy controlled by said receiving input circuit and to receive signal energy for the control of said transmitting output circuit, a source of potential, means for interconnecting said circuits comprising a conductive impedance device responsive to the signal from said remote station and responsive to the signal from said local station, said conductive impedance device having a cathode, a plurality of grids and an anode, means for connecting one of said grids to respond to the signal from said remote station, means connecting the second of said grids to said transducer and said source of potential, means connecting said anode in said transmitting output circuit, said first named grid acting as a control grid for said second grid when said second grid is acting as an anode in circuit with said transducer to receive signal energy controlled by said receiving input circuit, and said second grid acting coincidentally as a control grid for said anode connected in said transmitting output circuit, means connecting said first named grid and said first named anode in a grid to anode circuit of said receiving input circuit, and an impedance in said grid to anode circuit of said receiving input circuit for reducing the gain from said receiving input circuit to said transmitting output circuit to a desired minimum.

12. In an intercommunication system including a local station and a remote station wherein each station is characterized by a single transducer adapted simultaneously to function as a transmitter and a receiver, each station having a transmitting output circuit for the signal from said station, a receiving input circuit for the signal from a station remote with respect thereto; means for interconnecting said circuits at said station comprising a conductive impedance device responsive to the signal from the remote station and responsive to the signal from said station, said conductive impedance device having a cathode, a plurality of grids and an anode, means for connecting one of said grids to respond to the signal of the remote station, means for connecting the second of said grids to respond to the signal from said station, the first of said grids acting as a control grid for the second of said grids when said second grid is acting as an anode for said receiving input circuit.

13. In an intercommunication system including a local station and a remote station wherein each station is characterized by a single transducer adapted simultaneously to function as a transmitter and a receiver, each station having a transmitting output circuit for the signal from said station, a receiving input circuit for the signal from a station remote with respect thereto; means for interconnecting said circuits at said station comprising a conductive impedance device responsive to the signal from the remote station and responsive to the signal from said station, said conductive impedance device having a cathode, a plurality of grids and an anode, means connecting one of said grids to respond to the signal of the remote station, means connecting the second of said grids to respond to the signal from said station, the first of said grids acting as a control grid for the second of said grids when said second grid is acting as an anode for said receiving input circuit, means connecting said first named anode in said transmitting output circuit to the remote station, and said second grid acting coincidentally as a control grid for said transmitting output circuit.

14. In an intercommunication system including a local station and a remote station wherein each station is characterized by a single transducer adapted simultaneously to function as a transmitter and a receiver, each station having a transmitting output circuit for the signal from said station, a receiving input circuit for the signal from a station remote with respect thereto; means for interconnecting said circuits at said station comprising a conductive impedance device responsive to the signal from the remote station and responsive to the signal from said station, said conductive impedance device having a cathode, a plurality of grids and an anode, means connecting one of said grids to respond to the signal of the remote station, means connecting the second of said grid to respond to the signal from said station, the first of said grids acting as a control grid for the second of said grids when said second grid is acting as an anode for said receiving input circuit, means connecting said first named anode in said transmitting output circuit to the remote station, and said second grid acting coincidentally as a control grid for said transmitting output circuit, means connecting said first named grid and said first named anode in a grid to anode circuit of said receiving input circuit, and an impedance in said grid to anode circuit of said receivng input circuit for reducing the gain from said receiving input circuit to said transmitting output circut to a desired level.

WILLIAM A. PLICE.

REFERENCES CITED

The following references are of record in the file of this patent:

UNITED STATES PATENTS

| Number | Name | Date |
| --- | --- | --- |
| 1,711,562 | Fitter | May 7, 1929 |
| 2,055,921 | Baker | Sept. 29, 1936 |
| 2,366,011 | Donaldson | Dec. 26, 1944 |
| 2,427,496 | Feldscher | Sept. 16, 1947 |
| 2,460,475 | Tschumi | Feb. 1, 1949 |
| 2,461,945 | Tschumi | Feb. 15, 1949 |
| 2,477,275 | Tschumi | July 26, 1949 |